(12) United States Patent
Mittal (10) Patent No.: US 7,676,802 B2
(45) Date of Patent: Mar. 9, 2010

(54) SYSTEM, AND ASSOCIATED METHOD, FOR DOWNLOADING AN APPLICATION

(75) Inventor: Gaurav Mittal, Tampere (FI)

(73) Assignee: Nokia Corporation, Espoo (FI)

( * ) Notice: Subject to any disclaimer, the term of this patent is extended or adjusted under 35 U.S.C. 154(b) by 15 days.

(21) Appl. No.: 10/625,447

(22) Filed: Jul. 23, 2003

(65) Prior Publication Data

US 2005/0022182 A1   Jan. 27, 2005

(51) Int. Cl.
G06F 9/44 (2006.01)
G06F 9/445 (2006.01)
G06F 15/16 (2006.01)

(52) U.S. Cl. .................. 717/168; 717/173; 717/174; 717/178; 709/201; 709/203; 709/217; 709/219

(58) Field of Classification Search ......... 717/168–178; 719/320; 709/217–219, 201, 203; 455/418–419, 455/466
See application file for complete search history.

(56) References Cited

U.S. PATENT DOCUMENTS 5,999,740 A * 12/1999 Rowley ................. 717/173
6,665,867 B1 * 12/2003 Ims et al. ............... 717/173
6,910,047 B1 * 6/2005 Boucher et al. ............ 707/10
6,973,478 B1 * 12/2005 Ketonen et al. ........... 709/203
7,006,964 B2 * 2/2006 Aaltonen et al. ........... 703/24
7,035,828 B2 * 4/2006 Ketonen et al. ............ 705/51
2004/0034853 A1 * 2/2004 Gibbons et al. ........... 717/174
2004/0068724 A1 * 4/2004 Gardner et al. ........... 717/173

* cited by examiner

*Primary Examiner*—Hyung S Sough
*Assistant Examiner*—Qing-Yuan Wu
(74) *Attorney, Agent, or Firm*—Ditthavong Mori & Steiner, P.C.

(57) ABSTRACT

A method for facilitating the downloading of an application from a server computer to a client device, whereby the client device generates to the server computer an initiation request for information describing available applications. In response to receipt of the initiation request, the server computer retrieves, for each available application, information describing the respective application, and a link to an application descriptor for the respective application. The server computer transmits the information and link to the client device, which in turn displays the information and stores the link. When the user selects an application, the link for the selected application is recalled and is reached on the server computer for retrieval of the application descriptor. From the application descriptor, the client device may determine whether the application fits the device profile and, hence, whether to download the application.

38 Claims, 6 Drawing Sheets

SYSTEM, AND ASSOCIATED METHOD, FOR DOWNLOADING AN APPLICATION

TECHNICAL FIELD

The invention relates generally to communications between a wide area network and a handheld device and, more particularly, to a system, method and a computer-readable storage medium storing computer-executable instructions that, when executed by a processor, cause an apparatus to perform the method for downloading, via a wireless communications interface, an application from a server on a wide area network to a handheld device, such as a cellular mobile phone or a personal digital assistant (PDA), without using a browser.

BACKGROUND

A wide area network (WAN), such as the Internet, typically comprises at least one server, such as a relatively high-capacity computer, configured for serving a number of client devices, such as personal computers or mobile phones, connected to the WAN. It is often desirable to download, from the server to a client device, applications, such as games, or application content, such as wallpaper, ring tones, sound clips, and/or the like. To facilitate the download of an application (used herein to include content as well), a client device is conventionally provided with a browser having a content/application download model (CADM), such as a Java Application Management System (Java-AMS), Open Mobile Alliance-Content Download (OMA-CoD), Binary Runtime Environment for Wireless (BREW), and the like.

In using a browser to download an application in a conventional manner, a user first selects an application to download, and the browser then downloads from the server an application descriptor for the selected application. The client device then examines the application descriptor to determine whether the application is suitable for downloading to the device. If it is determined that the application is suitable for downloading, then, using the information in the application descriptor, the client device proceeds to download the application from the server for use by the user.

While browsers are effective mechanisms for downloading applications, they utilize a protocol stack, and the combination of the browser and the protocol stack consume in a client device a substantial portion of available memory and processing power. Even when a browser is not being used, it often continues to run in the background, thereby continuing to consume valuable memory and processing power. While this is not a significant drawback for conventional desktop computers, such as personal computers, which have substantial memory and processing power, it can constitute a problem with handheld devices, such as wireless personal digital assistants (PDAs), mobile cellular phones, and the like, that are configured for downloading applications from WANs, such as the Internet, and have relatively limited memory and processing power.

It is anticipated that the number of software applications available on WAN's, such as the Internet, and the like, will increase, such applications including enhanced browsers that will replace existing browsers. However, it can be problematic to download a new browser using an existing browser because, for example, the two browsers must be stored in memory, at least temporarily, at the same time, requiring not only additional memory, but also additional processing power. Furthermore, while a new browser mechanism may be provided with features (e.g., browsing) used often by the user, it may not be compatible with an existing download mechanism (e.g., CADM) residing in the handheld device. In such cases, when the user upgrades to a new browser, the new browser may not be able to download additional applications.

Accordingly, there is a need for a system and method for enabling handheld devices to download applications in a manner which is economical with respect to memory and processing power of the handheld device, and which is also preferably not dependent on a particular browser.

SUMMARY

The present invention, accordingly, provides a method for facilitating the downloading of an application from at least one server computer to a client device, whereby the client device generates to the server computer an initiation request for information describing available applications. In response to receipt of the initiation request, the server computer retrieves, for each available application, information describing the respective application and a link to an application descriptor for the respective application. The server computer then transmits the information and link to the client device, which in turn displays the information to the user and stores the link. When the user selects an application, the client device recalls the link for the selected application and reaches the link on the server computer for retrieval of the application descriptor. From the application descriptor, the client device determines whether the application fits the device profile and, hence, whether the application is suitable for downloading to the device. If the client device determines that the application is suitable for downloading, then the client device transmits a message to the server computer requesting that the application be downloaded, and downloading proceeds.

In one aspect of the invention, the at least one server computer comprises at least one of a network server, an application server, and the like, and/or a combination thereof.

In another aspect of the invention, the client device is at least one of a computer, a handheld device, a wireless personal digital assistant (PDA), a wireless mobile telephone, and the like.

There are a number of advantages of the invention over the prior art. For example, by using the present invention, applications may be downloaded using a single user interface that is not dependant on a particular CADM, thereby, not only streamlining the process of downloading applications, but also conserving memory and processing power, valuable commodities for handheld devices. The single user interface also allows flexibility for using other CADM's that may be developed for downloading applications. The invention is also robust as it utilizes proven, standard industry components, such as HTTP to fetch an application descriptor, and it is also extensible to a server-initiated download. The invention also enables service providers to more readily maintain the same end-user experience notwithstanding different download technologies, such as Java, BREW, CoD, and the like. Still further, the process of the invention is transparent to the end user, and requires no special knowledge on the part of the end user to utilize. Because the invention removes the dependency of the download mechanism on the browser, applications may also be downloaded irrespective of the browser, if any, residing in the client device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning handheld devices, application downloads from a WAN, such as the Internet, and the like, have been omitted because such details are not considered necessary to obtain a complete understanding of the present invention, and are considered to be within the skills of persons of ordinary skill in the relevant art.

It is noted that, unless indicated otherwise, all functions described herein are performed by a processor such as a microprocessor, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
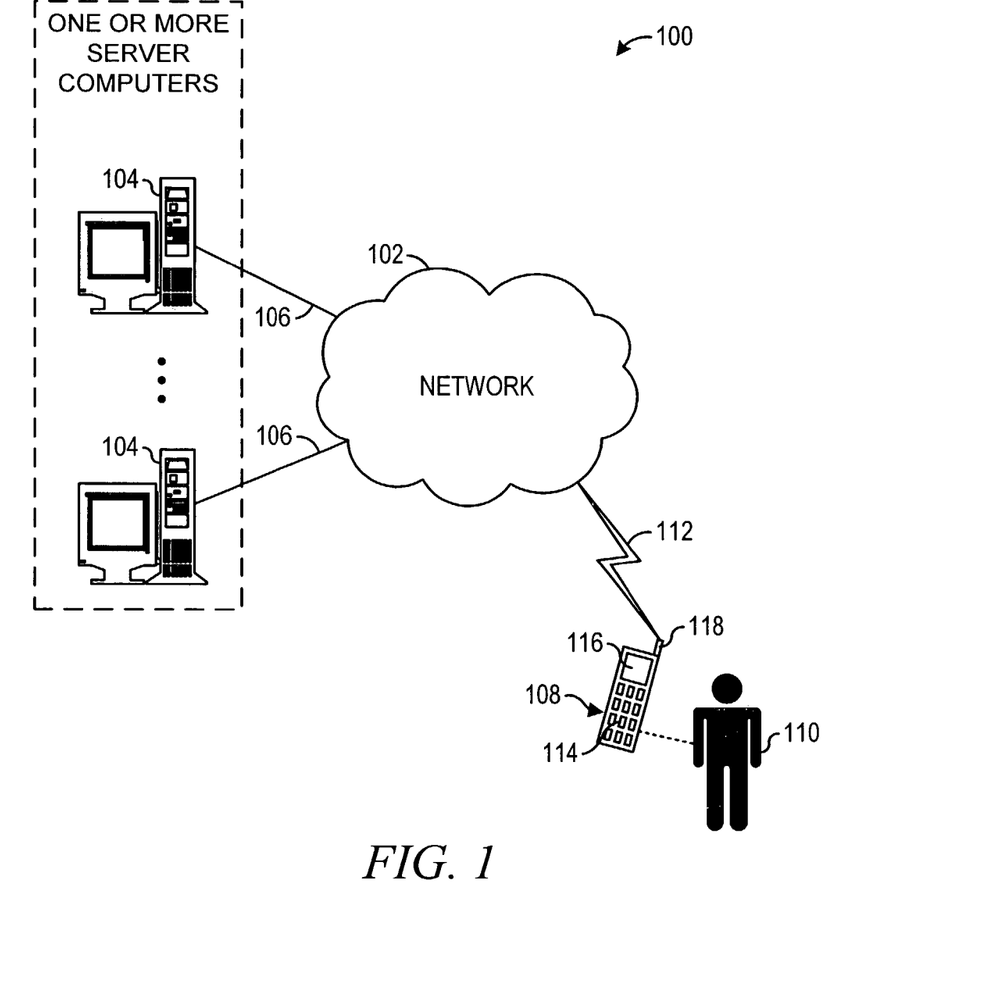
FIG. 1 is a schematic view of a telecommunications system in which features of the present invention may be implemented.

Referring to FIG. 1 of the drawings, the reference numeral 100 generally designates a system in which features of the present invention may be implemented. The system 100 includes a wide area network (WAN) 102, such as the Internet, to which at least one relatively high-capacity server computer 104, such as a network server computer, an application server computer, a combination thereof, or the like, described further below, having multiple applications available for downloading, is connected in a conventional manner, such as via landlines 106. At least one handheld device 108, such as a personal digital assistant (PDA), a cellular mobile telephone, or the like, operable by a user 110, is connected to the WAN 102, preferably via a wireless radio communication link 112, or alternatively via landlines (not shown). The handheld device 108 preferably includes an input device 114 such as a keypad, an output device 116 such as a visual display, an antenna 118 and, while now shown, it is understood that the handheld device 108 further includes a number of other components as well, such as an electronic data processor, a memory, and the like, operably interconnected for effectuating communications with the network server 104 via the WAN 102. The handheld device 108 may optionally incorporate a browser for downloading applications and application content from the network server 104, via the WAN 102, but such a browser is not necessary for the invention. The system 100, including the server computer 104 and handheld device 108, are considered to be well-known to those skilled in the art and, therefore, will not be described in further detail herein, except insofar as necessary to describe the present invention.

Figure 2:
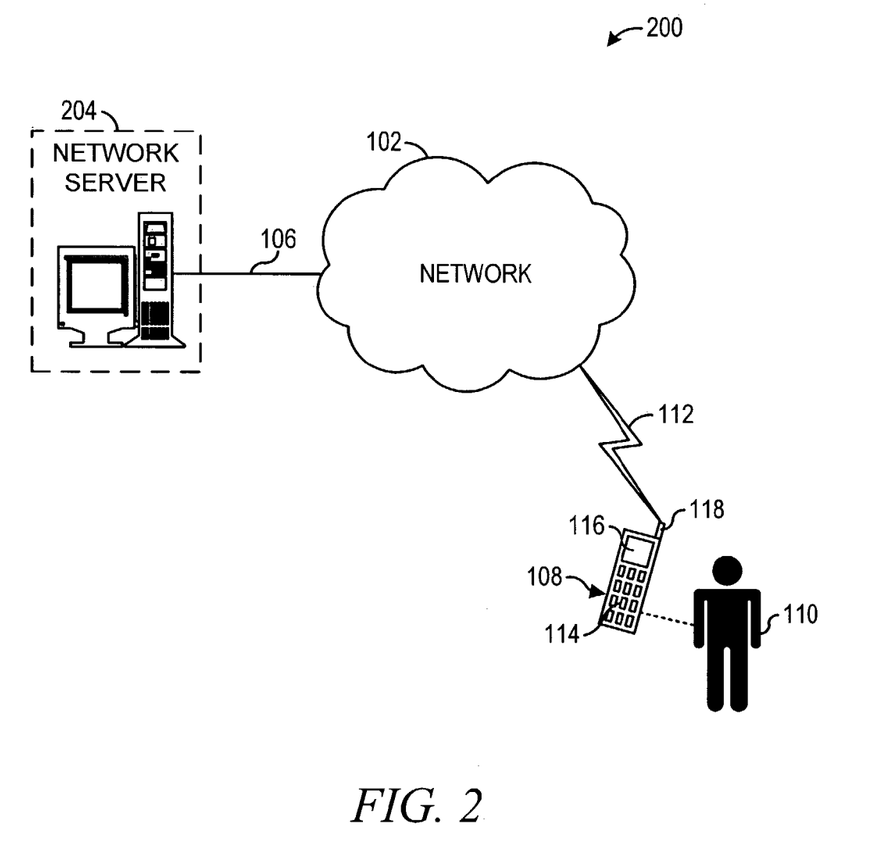
FIG. 2 is schematic view of the telecommunications system of FIG. 1 exemplifying a server computer as a network server.

FIG. 2 is a schematic drawing showing a system 200 similar to the system 100 of FIG. 1, but wherein the server computer 104 is exemplified as a network server 204. While a single network server 204 is illustrated in FIG. 2, multiple network servers may be connected to the WAN 102 for downloading applications to the handheld device 108.

Figure 3:
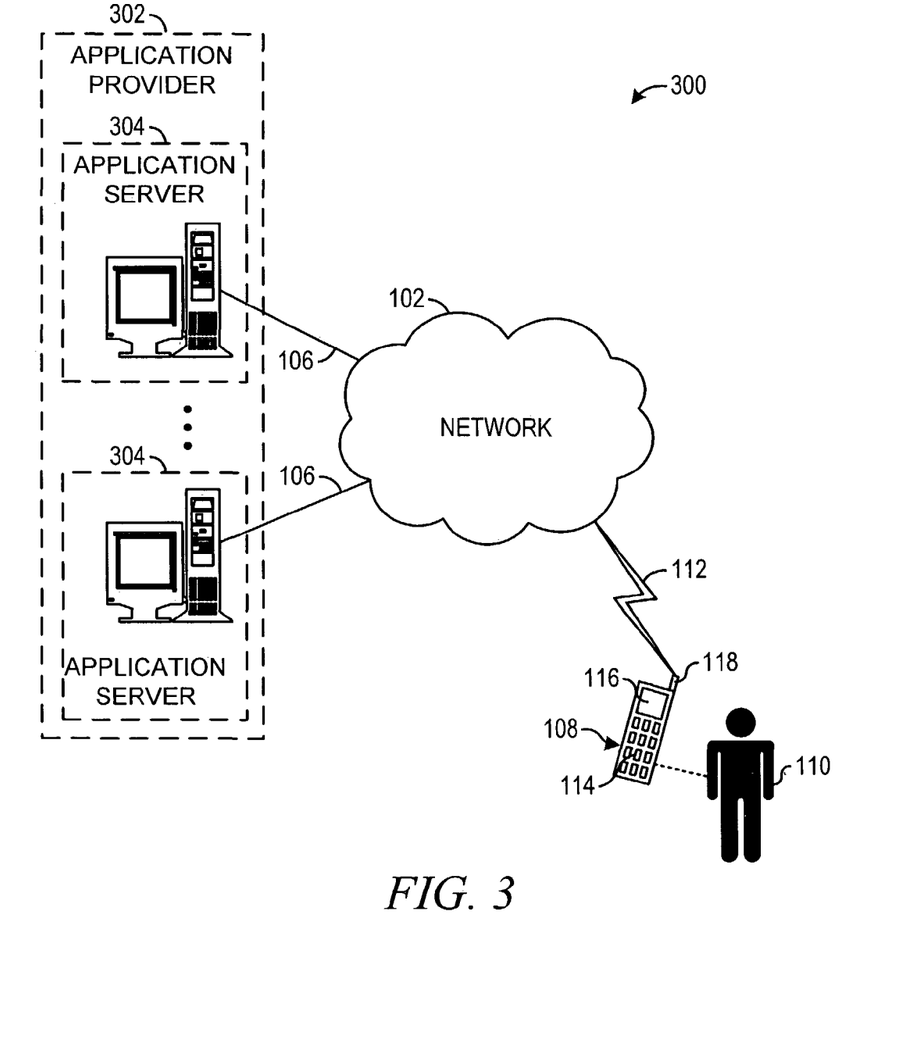
FIG. 3 is schematic view of the telecommunications system of FIG. 1 exemplifying a server computer as an application server.

FIG. 3 is a schematic drawing showing a system 300 similar to the system 100 of FIG. 1, but wherein the server computer 104 is exemplified as one of one or more application servers 204 operated by an application provider 302.

Figure 4:
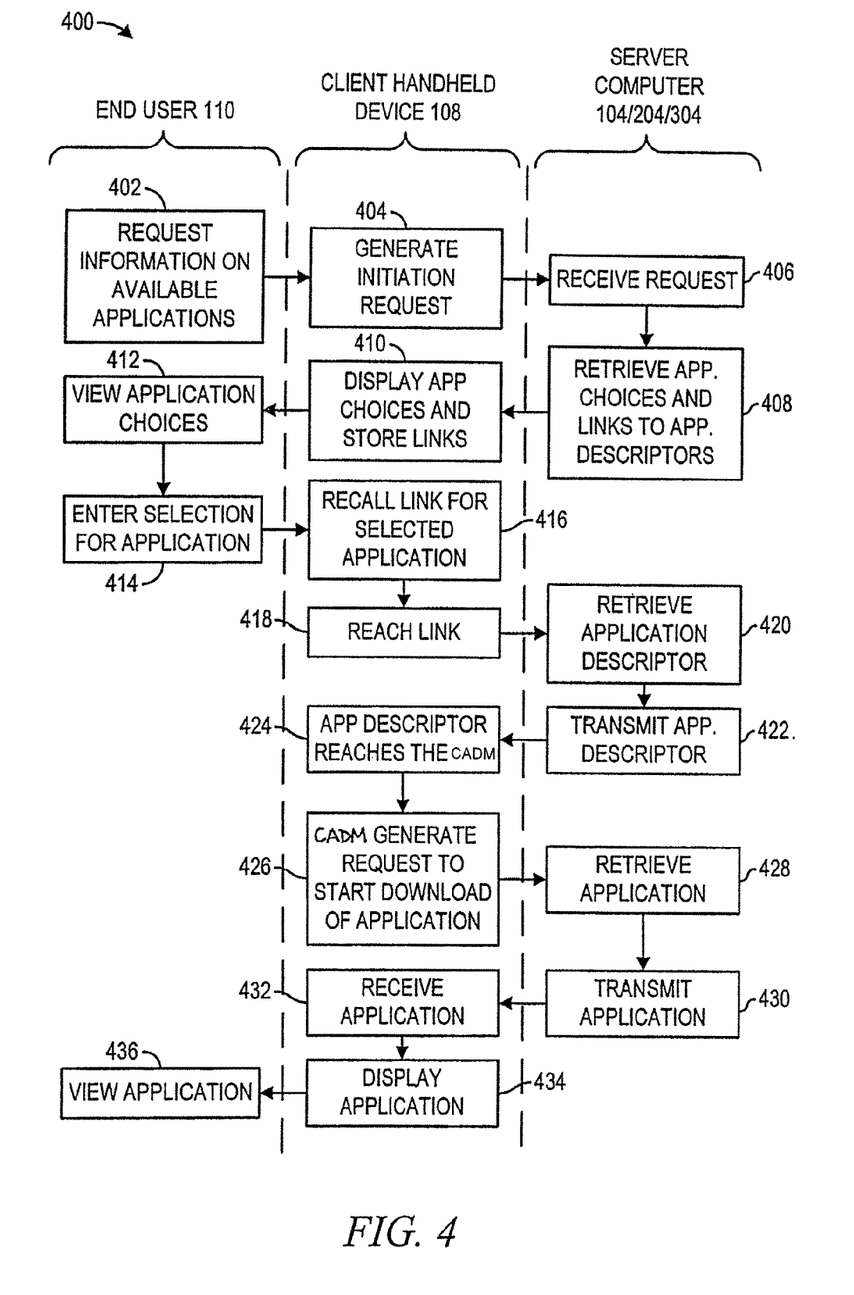
FIG. 4 is an event sequence diagram showing a sequence of events embodying features of the present invention for downloading applications in a telecommunications system exemplified by FIGS. 1, 2, and/or 3.

FIG. 4 is a flow chart, also referred to as an event sequence diagram, 400 of preferred control logic implemented by the server computer 104 and handheld device 108 for executing event sequences therebetween according to principles of the present invention. It should be noted, however, that in alternative embodiments, the sequencing of events may differ. It should be further noted, that the flow chart 400 is exemplified with respect to the server computer 104 as generally representative of the network server 204, application server 304, and the like. While not so indicated in FIG. 2, it is understood that communications between the server computer 104 and the handheld device 108 are effectuated via the WAN 102.

In event 402, the end user 110 enters, via any conventional input means, such as the keypad 116, a request to the handheld device 108 for information about applications (or application content) that are available for downloading to the handheld device. The availability of applications may be limited by criteria such as subject matter, the size of the application, and the like. Such applications may include any application, including applets, MIDlets, and/or the like, effective, by way of example, as a game, ring tune, and/or the like, available from the server computer 104 via the WAN 102. Such applications are preferably designed for execution on handheld devices, such as the handheld device 108, that have relatively limited memory and processor power.

In event 404, the client handheld device 108 receives the request from the user 110 and, in response thereto, generates an initiation message (e.g., HTTP GET, RTSP DESCRIBE, DevMan Package 1, and/or the like) to the server computer 104 to request information about applications available from the server computer.

In event 406, the server computer 104 receives the initiation message from the handheld device 108 and, in event 408, the server computer 104 retrieves descriptive information, such as text and/or a graphic, about each application that is available for downloading to the handheld device 108. In accordance with principles of the present invention, the server computer 104 also retrieves, for each respective application identified as being available for downloading, a link (e.g., a Uniform Resource Locator (URL), a Uniform Resource Identifier (URI), or the like) to an application descriptor (i.e., a set of attributes describing an application) for such respective application. The retrieved information about each application and its respective link is then transmitted to the client handheld device 108. The transmission to the handheld device 108 of a link to a respective application descriptor is preferably incorporated as a standard to thereby ensure operability of the invention.

At event 410, the handheld device 108 displays the information about applications available for downloading and, while the handheld device 108 does not display the link, it does stores the link in memory for subsequent recall. At the event 412, the user 108 views, preferably via the display 116, the applications available for downloading. In event 414, the user 108 selects, preferably via the keypad 114, an application to download. At the event 416, the link for the application selection is recalled from memory and, at the event 418, the link to the application descriptor is reached on the server computer 104 using a transport protocol such as, by way of example, HTTP, TCP, or the like.

At the event 420, the server 104 retrieves the application descriptor for the selected application and, in event 422, the server 104 transmits the application descriptor to the client handheld device 108.

At the event 424, the application descriptor reaches a content/application download model (CADM), such as a Java Application Management System (Java-AMS), open Mobile Alliance-Content Download (OMA-CoD), Binary Runtime Environment for Wireless (BREW), and the like, residing on the client handheld device 108. The CADM of the handheld device 108 then examines the application descriptor to determine whether the selected application is suitable for downloading to the handheld device 108. In making such determination, the CADM, by way of example, ensures that the handheld device 108 has a suitable operating environment (e.g., Java, BREW, or the like) for the application, that there is sufficient memory to store and execute the application, that the resolution of the display 116 is compatible with the application, and the like. If the CADM accordingly determines that the selected application is suitable for downloading, then at the event 426, the CADM generates to the server computer 104 a request to begin downloading the application.

At the event 428, the server computer 104 retrieves the application, preferably in a compressed format, and, at the event 430, downloads the application to the client handheld device 108. At the event 432, the client handheld device 108 receives the application and, if the application is compressed, then it is expanded and stored in the memory of the handheld device. At the event 434, the application is displayed via the display 116, and is viewed by the user 110 at the event 436.

Figure 5:
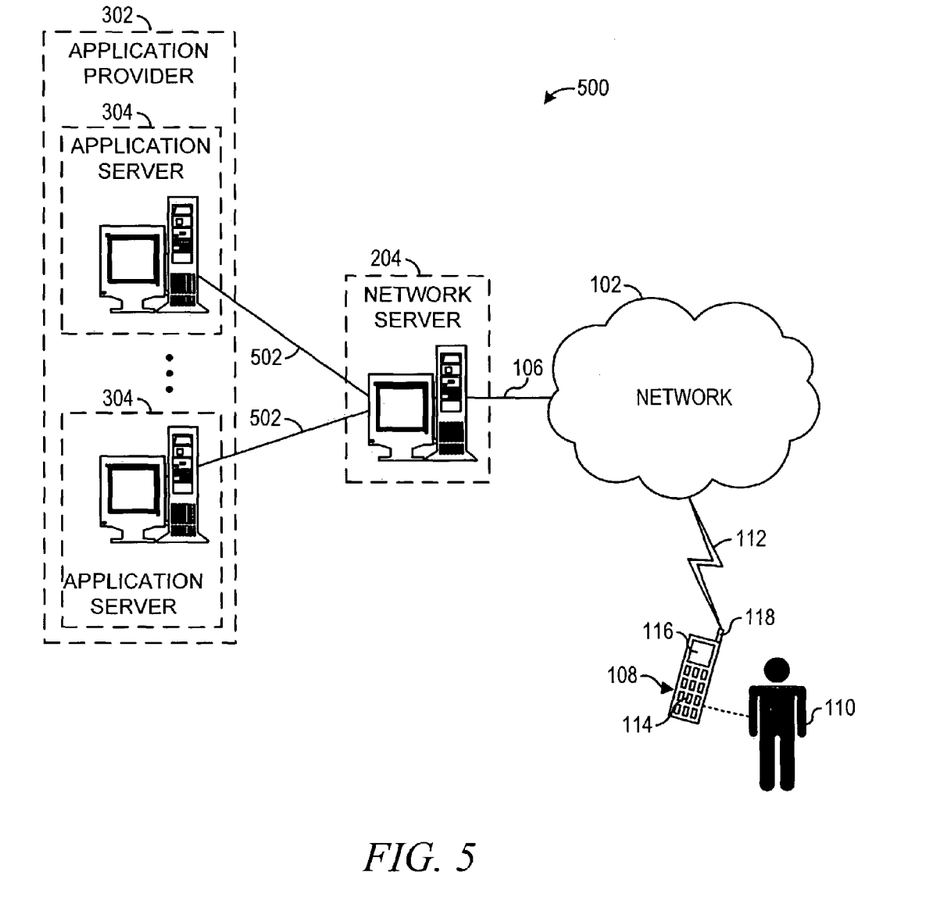
FIG. 5 is a schematic view of an alternate embodiment of the telecommunications system of FIG. 1 wherein a server computer is exemplified as an application server in combination with a network server.

FIG. 5 exemplifies a telecommunications system 500 of an alternative embodiment of the invention, wherein the network server 204, with links 502 (e.g., conventional wireline links and/or, alternatively, the WAN 102), serves as a communication link between the handheld device 108 and one or more of the application servers 304. Accordingly, as exemplified in FIG. 6, the events 406, 408, 420, 422, 428, and 430 are executed by the application server 304 via the respective communication links 605, 609, 619, 623, 627, and 631 effectuated by the network server 204. Operation of the system 500 is otherwise similar to the operation of the system 100 (FIG. 1), as exemplified with particular reference by the event sequence diagram 400 of FIG. 4.

Figure 6:
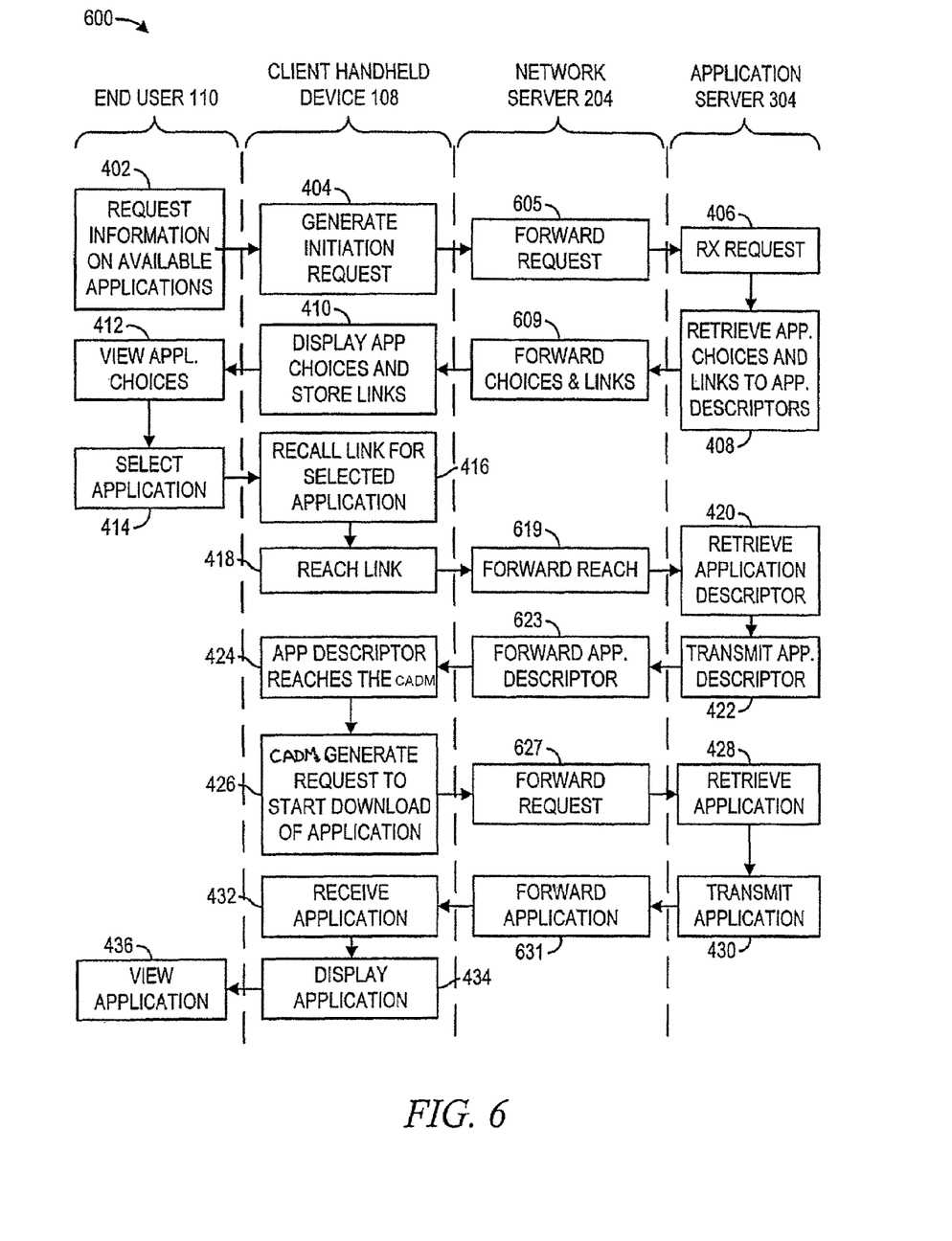
FIG. 6 is an event sequence diagram showing a sequence of events embodying features of the present invention for downloading applications in the telecommunications system exemplified by FIG. 5.

With general reference to steps 426, 428, 430, and 432, of FIG. 4 and/or FIG. 6, it is noted that once the handheld device 108 receives the link to application descriptors in step 424, the relationship and operation between the handheld device 108 and the server computer 104 (e.g., the network server 104 and/or the application servers 120) for downloading applications is considered to be well-known in the art and, therefore, will not be discussed in further detail herein, except by way of the following selected examples, which are not to be construed as limitations.

In a first example, at event 426, along with the application download request, the client handheld device 108 may also request application level security credentials. Then, in event 428, the server computer 104 sends the security credentials, and then awaits client approval before transmitting the application in event 430.

In another example of how the events 426, 428, 430, and 432 may be performed, at event 426, along with the application download request, the client handheld device 108 may request additional clarification in connection with the application descriptor. For example, the handheld device 108 may request clarification whether color is high color, true color, or 256 color, or whether images should be displayed in center screen, or left aligned, or right aligned.

In yet another example of how the events 426, 428, 430, and 432 may be performed, when the client handheld device 108 sends in event 426 an application download request for a particular version of, for example, a game, the server computer 104 may first respond with a notification message indicating that a higher version of the game is available, and a query requesting which version of the game the client would prefer. Alternatively, if a requested game requires an additional application to properly execute, then the server 104 may query whether the client 108 would prefer to proceed with or without downloading the additional application with the game.

Upon completion of the process of downloading the application, the application is preferably installed and executed in a conventional manner well known to those skilled in the art, and therefore will not be discussed in further detail herein.

By the use of the present invention, applications may be downloaded using a single user interface that is not dependent on a particular CADM, thereby, not only streamlining the process of downloading applications, but also conserving memory and processing power, valuable commodities for handheld devices. The single user interface also allows flexibility for using other CADM's that may be developed for downloading applications. The invention is also robust as it utilizes proven, standard industry components, such as HTTP to fetch an application descriptor, and it is also extensible to a server-initiated download. The invention also enables service providers to more readily maintain the same end-user experience notwithstanding the different download technologies, such as Java, BREW, CoD and the like. Still further, the process of the invention is transparent to the end user, and requires no special knowledge on the part of the end user to utilize. Because the invention removes the dependency of the download mechanism on the browser, applications may also be downloaded irrespective of the browser, if any, residing in the client device.

It is understood that the present invention may take many forms and embodiments. Accordingly, several variations may be made in the foregoing without departing from the spirit or the scope of the invention. For example, the present invention may be implemented in computers and devices other than handheld devices, such as conventional desktop computers, laptop computers, and the like. In another example, instead of generating an initiation request from the end user 110 and handheld device 108 at events 402 and 404, the user 110 may go to a web site, select an application, provide to the web site a mobile phone number of another user, and suggest to the other user that he/she try the application, so that, in event 406, the network server 104 receives the initiation request from the WAN (e.g., the Internet) rather than the other user's handheld device (e.g., mobile phone).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method, comprising:
   receiving from a client device an initiation request for information describing available application choices, the initiation request being initiated via a single user interface;
   responsive to the initiation request, retrieving for each available application information describing a respective application and a link to an application descriptor for the respective application, the application descriptor including attributes to allow a determination by the client device as to whether the respective application is suitable for the client device;
   transmitting from at least one server computer the application information and the link to the client device, wherein the application information includes information to be displayed at the client device, and the link is stored in a memory of the client device and not to be displayed at the client device;
   displaying at the client device the information included in the transmitted application information;
   initiating selection of an application contained in the displayed information;
   recalling from the memory a link corresponding to the selected application;
   reaching on the sewer computer an application descriptor via the link corresponding to the selected application;
   retrieving by the server computer the application descriptor; and
   transmitting by the server computer the application descriptor to the client device.

2. The method of claim 1, wherein the at least one server computer comprises at least one of a network server and an application server.

3. The method of claim 1, wherein the at least one server computer comprises at least one application server coupled to the client device via at least one network server.

4. The method of claim 1, wherein the link is one of a uniform resource locator and a uniform resource identifier.

5. The method of claim 1 wherein the determination by client device includes whether the client device has a suitable operating environment for the respective application.

6. The method of claim 1 wherein the determination by the client device includes whether the client device has sufficient memory to store and execute the respective application.

7. The method of claim 1 wherein the determination by the client device includes whether a display for the client device is compatible with the respective application.

8. The method of claim 1, further comprising:
   receiving, from the client device, a clarification request for an associated application descriptor; and
   responding to the clarification request with additional attribute information for the associated application.

9. The method of claim 1, further comprising:
   determining that an additional application is required to properly execute an application requested by the client; and
   transmitting a query to the client device, to determine whether the application download should proceed with the additional application.

10. The method of claim 1, further comprising:
    receiving a query at the client device, to determine whether the application download should proceed with the additional application.

11. A method, comprising:
    receiving at a client device a request for information describing available application choices;
    generating by the client device an initiation request for information describing available application choices and for a link to an application descriptor corresponding to each respective available application, the initiation request being initiated via a single user interface, the application descriptor including attributes to allow a determination by the client device as to whether the respective application is suitable for the client device;
    in response to the initiation request, receiving at the client device from an application sewer computer through a network server computer at least one application choice and a corresponding link to an application descriptor for the at least one application;
    storing the corresponding link in a memory of the client device;
    displaying, at the client device, information identifying the at least one application choice, but not the corresponding link;
    receiving at the client device a request for an application of the at least one application choices displayed;
    recalling from the memory a link corresponding to the application requested;
    sending from the client device a request externally for an application descriptor corresponding to the application requested, the request comprising the link to the application descriptor; and
    receiving at the client device the application descriptor requested.

12. The method of claim 11, wherein the corresponding link is one of a uniform resource locator and a uniform resource identifier.

13. The method of claim 11, wherein the selected application is downloaded via content/application download model is one of Java application management system, binary runtime environment for wireless, and CoD.

14. The method of claim 11 wherein the determination by the client device includes whether the client device has a suitable operating environment for the respective application.

15. The method of claim 11 wherein the determination by the client device includes whether the client device has sufficient memory to store and execute the respective application.

16. The method of claim 11 wherein the determination by the client device includes whether a display for the client device is compatible with the respective application.

17. The method of claim 11, further comprising:
    transmitting, from the client device, a clarification request for an associated application descriptor; and
    receiving a response to the clarification request with additional attribute information for the associated application.

18. A system comprising:
at least one server computer;
a client device;
a wide area network configured to interconnect at least one server computer and a client device;
the client device being configured to:
receive from a user a request for information describing available application choices, and
generate an initiation request for information describing available application choices and for a link to an application descriptor corresponding to each respective available application, the initiation request being initiated via a single user interface, the application descriptor including attributes to allow a determination by the client device as to whether the respective application is suitable for the client device,
receive from the at least one server computer the information describing available application choices and corresponding links, and store the links in a memory,
display the information describing available application choices, without displaying the corresponding links,
initiate selection of an application contained in the displayed information, and
recall from the memory a link corresponding to the selected application; and
the at least one server computer being configured to:
receive the initiation request for information describing available application choices and, in response to receipt of the initiation request, retrieve for each available application information describing the respective application and a link to an application descriptor for each respective application,
reach thereon an application descriptor via the link corresponding to the selected application,
retrieve the application descriptor, and
transmit the application descriptor to the client device.

19. The system of claim 18, wherein the at least one server computer is further configured to receive a request for the application descriptor, the request comprising the link for the application descriptor.

20. The system of claim 18, wherein the client device is one of a computer, a handheld device, a personal digital assistant, and a wireless mobile telephone.

21. The system of claim 18, wherein the at least one sever computer comprises at least one of a network sewer and an application server.

22. The system of claim 18, wherein the at least one sewer computer comprises at least one application sever coupled to the client device via at least one network server.

23. The system of claim 18, wherein the link is one of a uniform resource locator and a uniform resource identifier.

24. An apparatus, comprising:
at least one processor;
at least one memory including computer program code,
wherein the at least one memory and the computer program code configured to, with the at least one processor, cause the apparatus to perform at least the following:
receive, from a client device, an initiation request for information describing available application choices, the initiation request being initiated via a single user interface;
responsive to the initiation request, retrieve for each available application information describing the application and a link to an application descriptor for the respective application, the application descriptor including attributes to allow a determination by a client device as to whether the respective application is suitable for the client device;
transmit the application information and the link to the client device, wherein the application information includes information to be displayed at the client device, and the link is not to be displayed at the client device;
reach thereon an application descriptor via a link corresponding to an application selected at the client device;
retrieve the application descriptor; and
transmit the application descriptor to the client device.

25. The apparatus of claim 24, wherein the apparatus is further caused to:
receive from the client device a request for the application descriptor, the request comprising the link to the application descriptor.

26. The apparatus of claim 24, wherein the apparatus is further caused to:
receive from the client device a request for the application descriptor;
receive from the client device a request to download the selected application;
retrieve the selected application; and
transmit the selected application to the client device.

27. The apparatus of claim 24, wherein the client device is one of a computer, a handheld device, a personal digital assistant, and a wireless mobile telephone.

28. The apparatus of claim 24, further comprising a memory connected to the processor and storing program information.

29. An apparatus, comprising:
at least one processor;
at least one memory including computer program code,
wherein the at least one memory and the computer program code configured to, with the at least one processor, cause the apparatus to perform at least the following:
receive at an input device thereof a request for information describing available application choices;
generate, at an output device thereof, an initiation request for information describing available application choices and for a link to an application descriptor corresponding to each respective available application, the initiation request being initiated via a single user interface, the application descriptor including attributes to allow a determination by a client device as to whether the respective application is suitable for the client device;
in response to the initiation request, receive at the input device at least one application choice and a corresponding link;
display information describing the at least one application, but not the corresponding link;
store the corresponding link in a memory thereof;
display at the output device the at least one application choice, without displaying the corresponding link;
receive at the input device a request for one application of the at least one application choice displayed; and
recall from the memory the link for the application requested.

30. The apparatus of claim 26, wherein the apparatus is further caused to:
receive at the input device an application descriptor for the application requested;
generate at the output device, via a content/application download model, a request to download the application requested; and
receive at the input device the application requested.

31. The apparatus of claim 29, wherein the apparatus is further caused to:
   determine from the application descriptor whether an application is suitable for downloading; and
   upon a determination that the application is suitable for downloading, download the application in a wireless browser independent manner.

32. The apparatus of claim 29, wherein the link to an application descriptor corresponding to each respective available application is one of a uniform resource locator and a uniform resource identifier.

33. The apparatus of claim 29,
   wherein the input device is coupled to the processor;
   the output device is coupled to the processor; and
   the memory is coupled to the processor and stores instructions to configure the processor.

34. A computer-readable storage medium storing computer-executable instructions that, when executed by a processor, cause an apparatus to perform:
   receiving, from a client device communicating an initiation request for information describing available application choices, the initiation request being initiated via a single user interface;
   responsive to the initiation request, retrieving for each available application information describing a respective application and a link to an application descriptor for the respective application, the application descriptor including attributes to allow a determination by the client device as to whether the respective application is suitable for the client device;
   transmitting from at least one server computer the application information and the link to the client device, wherein the application information includes information to be displayed at the client device, and the link is stored in a memory of the client device and not to be displayed at the client device;
   displaying at the client device the information included in the transmitted application information;
   initiating selection of an application contained in the displayed information;
   recalling from the memory a link corresponding to the selected application;
   reaching on the sewer computer an application descriptor via the link corresponding to the selected application;
   retrieving by the sewer computer the application descriptor; and
   transmitting by the sewer computer the application descriptor to the client device.

35. The computer-readable storage medium of claim 34, the computer-executable instructions further comprising instructions which, when executed by a processor, cause the apparatus to perform:
   receiving from the client device a request for an application descriptor;
   receiving from the client device a request to download a selected application;
   retrieving the selected application; and
   transmitting the selected application to the client device.

36. A computer-readable storage medium storing computer-executable instructions which, when executed by a processor, cause an apparatus to perform:
   receiving a request for information describing available application choices;
   generating an initiation request for information describing available applications and for a link to an application descriptor corresponding to each respective available application, the initiation request being initiated via a single user interface, the application descriptor including attributes to allow a determination by a client device as to whether the respective application is suitable for the client device;
   in response to the initiation request, receiving at least one application choice and a corresponding link to an application descriptor for the at least one application;
   displaying, at the client device, information describing the at least one application, but not the corresponding link;
   storing the corresponding link in a memory of the client device;
   receiving a request for an application of the at least one application choices displayed;
   recalling from the memory a link corresponding to the application requested;
   sending a request externally for an application descriptor corresponding to the application requested, the request comprising the link to the application descriptor; and
   receiving the application descriptor requested.

37. The computer-readable storage medium of claim 36, the computer-executable instructions further comprising instructions which, when executed by the processor, cause the apparatus to perform the following:
   generating, via a content/application download model, a request to download the application requested; and
   receiving and displaying the application requested.

38. The computer-readable storage medium of claim 37, wherein the content/application download model is one of Java application management system, binary runtime environment for wireless, and CoD.

* * * * *